United States Patent [19]
Brann

[11] Patent Number: 5,842,205
[45] Date of Patent: *Nov. 24, 1998

[54] METHOD AND PROCESS OF INTER-MACHINE COMMUNICATION AND GENERALIZED METHOD FOR PROGRAM PREPARATION THEREFOR

[75] Inventor: John E. T. Brann, New York, N.Y.

[73] Assignee: VIE Systems, Inc., Lyndhurst, N.J.

[ * ] Notice: The terminal 12 months of this patent has been disclaimed.

[21] Appl. No.: 161,229

[22] Filed: Dec. 2, 1993

[51] Int. Cl.$^6$ ........................................... G06F 17/30
[52] U.S. Cl. .............................. 707/4; 707/103; 395/685
[58] Field of Search ..................... 395/600, 700, 395/685; 364/DIG. 1, DIG. 2; 707/4, 103

[56] References Cited

U.S. PATENT DOCUMENTS

| | | | |
|---|---|---|---|
| 4,729,096 | 3/1988 | Larson | 395/700 |
| 4,736,320 | 4/1988 | Bristol | 364/300 |
| 4,791,558 | 12/1988 | Chaitin et al. | 395/500 |
| 4,821,180 | 4/1989 | Gerety et al. | 395/275 |
| 4,841,441 | 6/1989 | Nixon et al. | 364/401 |
| 4,939,668 | 7/1990 | Brown et al. | 364/513 |
| 5,121,497 | 6/1992 | Kerr et al. | 395/650 |
| 5,142,469 | 8/1992 | Weisenborn | 364/146 |
| 5,142,681 | 8/1992 | Driscoll et al. | 395/700 |
| 5,159,687 | 10/1992 | Richburg | 395/700 |

*Primary Examiner*—Maria N. Von Buhr
*Attorney, Agent, or Firm*—Furgang & Adwar, LLP

[57] ABSTRACT

A computer programming method is provided for translating source messages to target messages. The translational steps are described in a database in which all necessary instructions and data are stored. A control program has the limited functions of responding to source messages and accessing the database. The database then directs the control program to access subroutines called translation method programs. The translation method programs then access the source message in a step-by-step process to translate the source message to the target message. The translation method programs send messages to the control program to advise if each step in the translation process has or has not been successfully accomplished. The control program, responding to the database and the translation method programs, then delivers the completely translated target message to the receiver.

53 Claims, 6 Drawing Sheets

METHOD AND PROCESS OF INTER-MACHINE COMMUNICATION AND GENERALIZED METHOD FOR PROGRAM PREPARATION THEREFOR

BACKGROUND OF THE INVENTION-FIELD OF APPLICATION

This invention relates to the field of computer program construction and, in particular, the construction of data translation programs. More particularly, this invention relates to a late binding process for providing an efficient system for assembling and for translating information from one computer to another.

BACKGROUND OF THE INVENTION-DESCRIPTION OF THE PRIOR ART

The history of computer systems and the programs used therein have developed quickly over the past thirty five years. The earliest processes to be automated were large scale, batch data processing tasks, such as payroll production. Thereafter, other problems were addressed. As each new problem is addressed and solution implemented, an additional body of computer programs is created. The nature of the industry is such, however, that new programs are preferred over improvements to existing solutions. This has resulted in new systems being built which are unrelated to those which already exist. Over time, the number of independent systems has grown enormously. There has been little attention paid to coordination of the data between the various competing programs.

The huge amount of competing programs has led to the development of software construction techniques to permit the rebuilding of systems more efficiently. The development of such techniques resulted in Fourth Generation Languages (4GL) in the early 1980's. While it was widely predicted that 4GL would make the replacement of such systems easy and quick, making it practical to replace major systems as often as every four or five years, this has not happened.

When programs are improved the entire executable program must be replaced. This is a consequence of the process of program creation which takes many pieces of handwritten source code compiles each to object code and then constructs the single executable program from these objects. As a result, any change in any piece of source code creates a significant change in the executable program which may give rise to side effects. After rewriting, the program must be subject to regression testing in which the entire program is retested to detect any of these side effects. A further difficulty incurred is that of swapping over from one version of a program to another program. This incurs significant down time and retraining of personnel. To this must be added significant delays for testing. One attempt to improve on this problem has been use of computer aided software engineering tools such as code generators. These techniques address, with varying degrees of success, the speeding up of the creation of programs. However, they do not attack the main difficulty of the numerous steps that must be taken to improve a program or create a new program. The steps in preparing a program or revision to the program in the prior art may be seen in FIG. 1, in which the "change requirement" flows to "design software changes" to "design". The "original program" and "design" then flow to "change program" to "changed program" to "system test" to "accept new program" to "replace original program" to "new program".

Another approach to program creation is generally referred to as Object Orientation ("OO"). The general theory behind this method of program preparation is the recognition that for any type of computer system there is a set of non-trivial operations and associated information which is used in many instances. For example, in a computer system which automates some banking operations, there will be frequent demands for processing amounts of money. These processes are not a part of the basic operation of a computer. They are composed of several computational operations which form a common part of many larger algorithms. In an OO environment these partial algorithms, and their associated data structures, are known as "objects". This technique is an extension of the well known practice of creating subprograms for commonly repeated tasks. OO programming languages include structures to make this approach to program division easier and more powerful than previously existing languages. The overall effect of the OO techniques is similar to the code generators: to improve on the "original program" creation stage (FIG. 1).

The difficulties caused by system testing and program replacement are due to the difference between computer source code and executable images. Source code is created by programmers or code generators. It is normally in some reasonably human-readable language (e.g., COBOL, FORTRAN, C, PROLOG, etc.). Each of these languages has very formal rules of grammar and syntax. The source code is used to transcribe algorithms from a design into a form which can be interpreted by a compiler. Compilers are programs which convert source code into the intermediate form, object code. The object code is an intermediate form between the human-readable source code and the executable image which can actually run on the computer. The last stage is the execution of a program called a link editor (or linker) which takes one or more pieces of object code and converts them into a form which can be executed by a computer. The flow of this prior art method of program preparation is shown in FIG. 2. The executable image is the only form of the program which runs on the computer. It alone determines the behavior of the program. The source code is the only form manipulated by programmers or code generators. The side effects, referred to above, can result because the executable image of any program is very complex. It is always possible that unforeseen side-effects may arise in the executable image which were not intended by the programmer or code generator of the source code.

The overall problems in replacing systems caused by the logistic of converting the data contained in such systems, implementing the new software, and re-education of users means that such systems will continue to exist for a considerable period of time. This means that these systems must be used in multi-user, networked systems so that the data these systems contain can be used by later-developed systems.

Yet another difficulty lies in the interaction between different systems. Very often the connection between multiple systems is manually accomplished. For example, printed records from one computer system are then entered manually into a second system. This is slow, tedious, and, as a consequence, inefficient and costly. Another well known approach is to place a new program between existing systems to act as a go-between. In either case, programming must be done.

SUMMARY OF THE INVENTION

It is an object of this invention to provide a computerized method of efficiently translating source messages to target messages.

It is still another object of this invention to provide a computer program in which changes may be made to the program without having to rewrite the entire source code of the program.

It is still a further object of this invention to provide a method of creating programs by storing and calling upon basic programming elements and combining those elements for use at the program's execution-time.

In accordance with the objects of this invention, there is provided a late binding computer program method for acting upon source messages in the setting of a computer of the type having a temporary memory and in which the program translates a predetermined source message to a predetermined target message, the late binding program comprising:

(a) providing a control program;
(b) providing the source messages to the control program;
(c) providing a database;
(d) storing instructions and data in the database;
(e) causing the control program to access the database;
(f) responding under control of the control program, to instructions and data stored in the database;
(g) providing at least one translation method or subroutine program;
(h) causing the control program, responsive to instructions stored in the database, to call the translation method program;
(i) causing the translation method program, in response to instructions in the data base, to translate at least part of the message received; and
(j) limiting the control program to responding to the source message, accessing the database, and executing the translation method program in response to instructions and data stored in the database.

In another embodiment of this invention there is provided a late binding computer program method for creating programs in which there is provided to the late binding computer program source stimuli in which each stimulus is of the type comprising one of a set of a predetermined number of events and one of a predetermined set of data structures, and wherein the late binding computer program is of the type which can invoke at least one subroutine (i.e., an "application method program"), the late binding computer program method comprising:

(a) providing a control program;
(b) providing the source stimuli to the control program;
(c) providing a database;
(d) storing instructions, data, and the structures of any source stimuli to be acted upon in the database;
(e) causing the control program to access the database;
(f) responding under control of the control program to instructions and data stored in the database;
(g) causing the control program, in response the stimuli and to instructions and data in the database, to be capable of invoking at least one application method program; and
(h) limiting the control program to responding to the source stimulus, accessing the database, and responding to instructions and data stored in the database.

In yet another embodiment of this invention there is provided a method of writing a translation program for translating a source message into a target message comprising:

(a) identifying the characteristics and parameters of the target message;
(b) identifying the characteristics of the source message;
(c) deriving the requirements to translate the source message to the target message;
(d) providing a database;
(e) storing in the database data and instructions corresponding to the steps necessary to translate the source message to the target message;
(f) writing a translation method program for each transformation of each type of element of the source message to each type of element of the target message;
(g) storing a reference in the database to the translation method programs;
(h) storing instructions in the database identifying which translation method programs are to be called;
(i) restricting the control program so as to be controlled at all times by the instructions and data in the database; and
(j) causing the control program to obtain from the database, upon receipt of a source message, the instructions in the database to direct the control program and call upon predetermined translation method subroutines to translate the source message to the target message.

In still another embodiment of this invention there is provided a method of writing an application program comprising:

(a) listing all stimulus messages the application program is to receive;
(b) providing a list of each operation each application translation method program is to carry out and the sequence of operations;
(c) providing a database;
(d) storing the stimuli in a table in the database;
(e) storing the instruction to execute the application method program in the database as a message comprising a reference to the application method program and a reference to the parameters that the application method program will use;
(f) determining each stimuli to be received by the application program and denominating the stimuli as a source message;
(g) determining the parameter structures for each of the application method programs to be executed and denominating each as a target message;
(h) identifying the characteristics and parameters of each target message;
(i) identifying the characteristics of the source message;
(j) deriving the requirements to translate the source message to the target messages;
(k) storing in the database data and instructions corresponding to the steps necessary to translate the source message to the target message;
(l) obtaining an application method program for each application step;
(m) storing instructions in the database identifying which application method programs are to be called;
(n) causing instructions in the database to have the control program call the application method programs and create the parameters associated with each application method program from elements of the source stimulus;
(o) restricting the control program so as to be controlled at all times by the instructions and data in the database; and (p) causing the control program to call upon the database upon receipt of a source message; the instructions in the database to direct the control program and call upon predetermined application method programs to translate the source message to the target message and provide the target message as at least a portion of the completed program.

DESCRIPTION OF THE PREFERRED EMBODIMENTS

There is a need for a mechanism which will aid in the rapid integration of computer systems and a second need for a faster way of developing and changing systems. A single solution is capable of providing an answer to both of these problems.

The time necessary to prepare either a new program or to rewrite a program can be predicted with accuracy by a concept known as "binding time". In order to analyze computer program operations, the concept of Binding Time is used. Binding time describes the point in the creation of a program at which its behavior is fixed. For example, if a program contains the line:

$x:=3+4$ meaning set a variable x to the sum of 3 and 4) then the value of x created by executing the statement will always be 7. The "binding time" behavior of this statement is, therefore, the time at which the program is compiled. This will be the earliest possible binding time.

Now consider an alternative statement:

$x:=a+b$ (meaning "give a variable x the value of the sum of the variables a and b").

In addition, put the statement into a subroutine:

subroutine (a,b)

$x:=ay+b;$ return x;

The behavior of this statement is that the value of x cannot now be determined from this algorithm because it depends on the values of the variables a and b. The variables a and b are owned by the program which "calls" the subroutine. This call/response relationship is not determined at compile time. It is determined when the program is linked into an executable form. As a result the "binding time" has been moved back to the "link-edit" time.

As a final example, imagine a program which contains the statement:

$x:=a+b;$

This time the program is constructed in such a way that the values of a and b are provided by a user sitting at a terminal. In this case the behavior of the program is not decided until it is running. The "binding time" is now the "run time". This result is useful since the program is able to correctly carry out actions which were not explicitly envisaged by the designer. Anyone designing such an addition program would not go through the process of explicitly designing in every possible combination of two numbers (a,b) which could be added together, yet the program will correctly add together any two such numbers.

Programs with late "binding times" have the advantage in that they need not be recompiled or re-linked in order to offer new functions. Implementation of program changes, and new programs, using such program methods, reduce the system testing phase to only such testing as is required by the new functions. The old functions would be unaffected because the executable image was not altered in any way. Since there is no change to the executable image there is no need for the inconvenience of replacing it in the running system.

Figure 1:
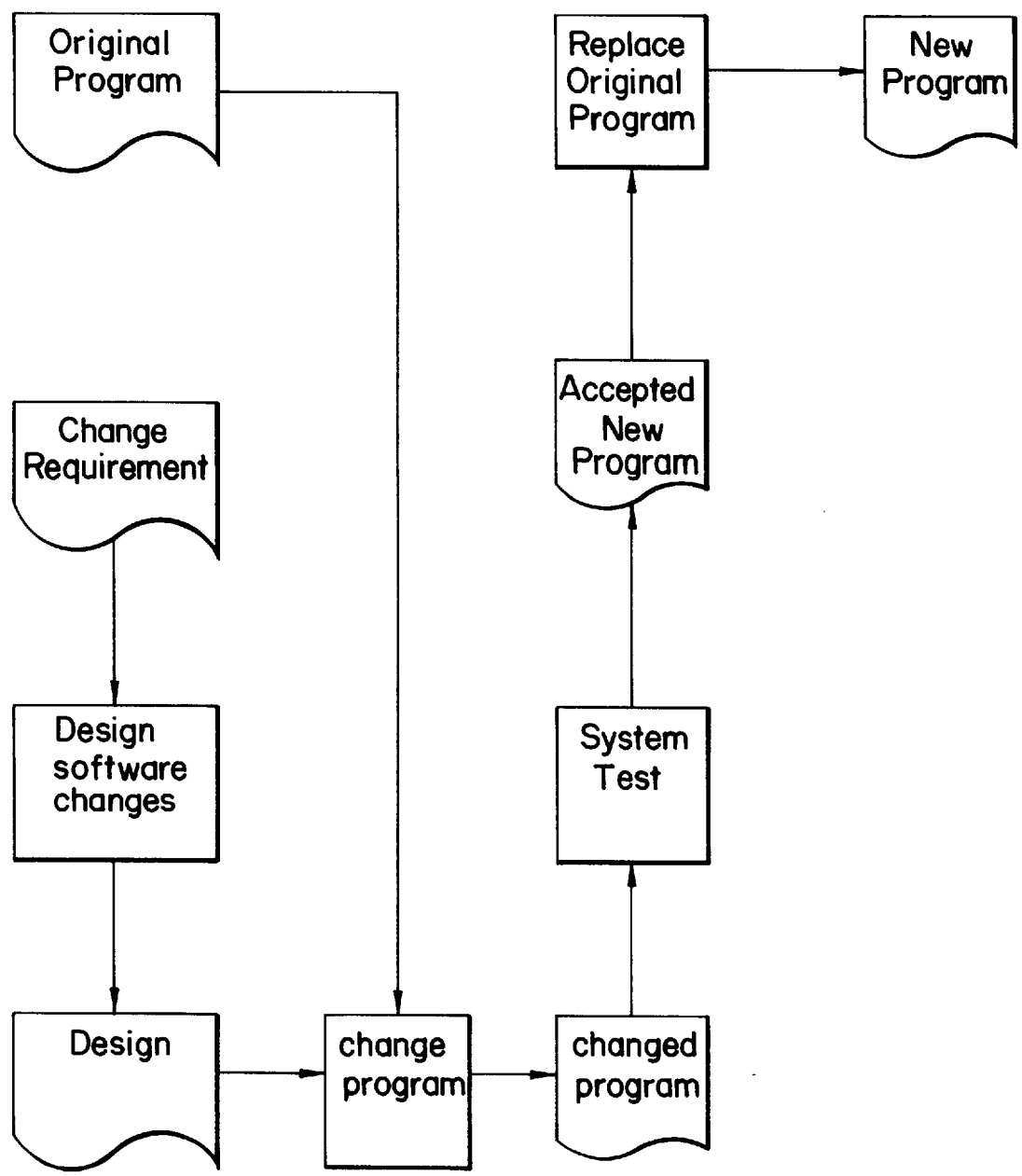
FIG. 1 is a flow diagram of the steps required to prepare a program under the prior art.
Figure 2:
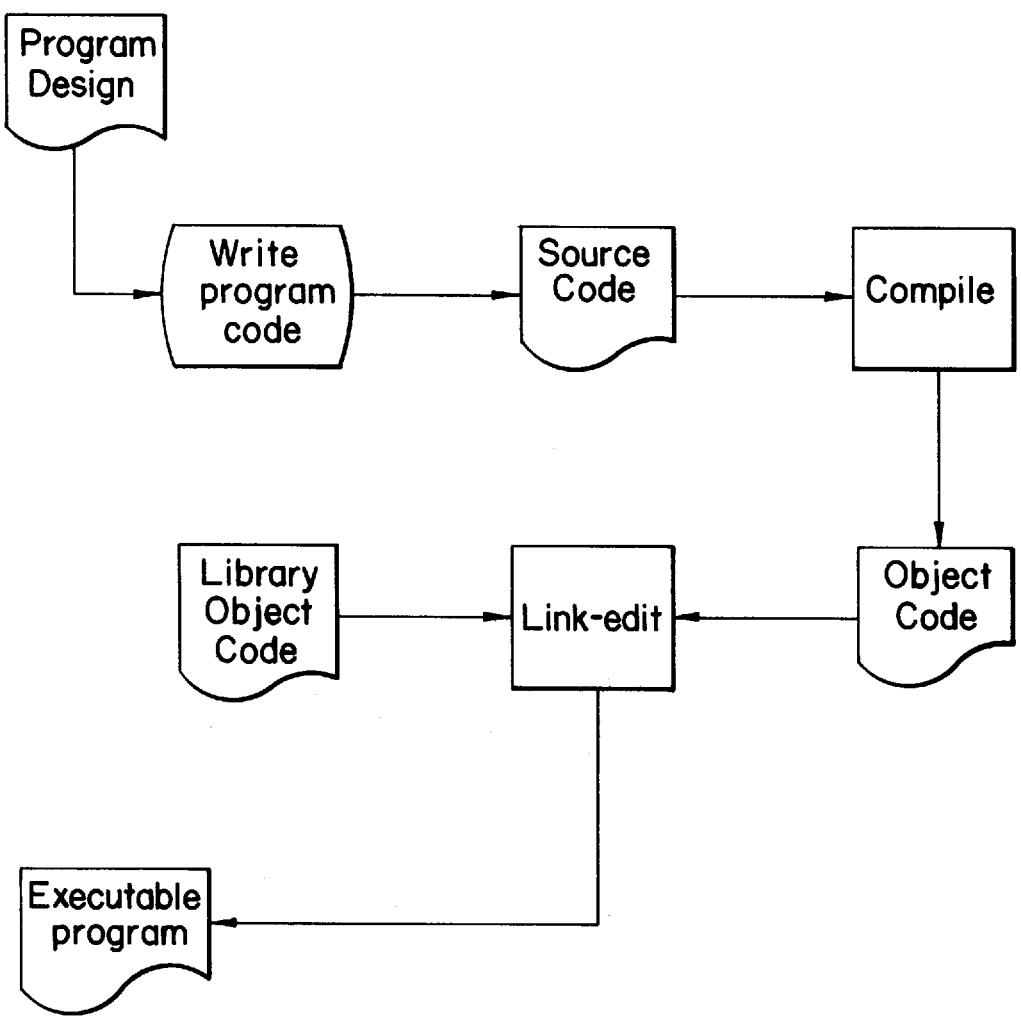
FIG. 2 is a flow diagram of the steps of program preparation.
Figure 3:
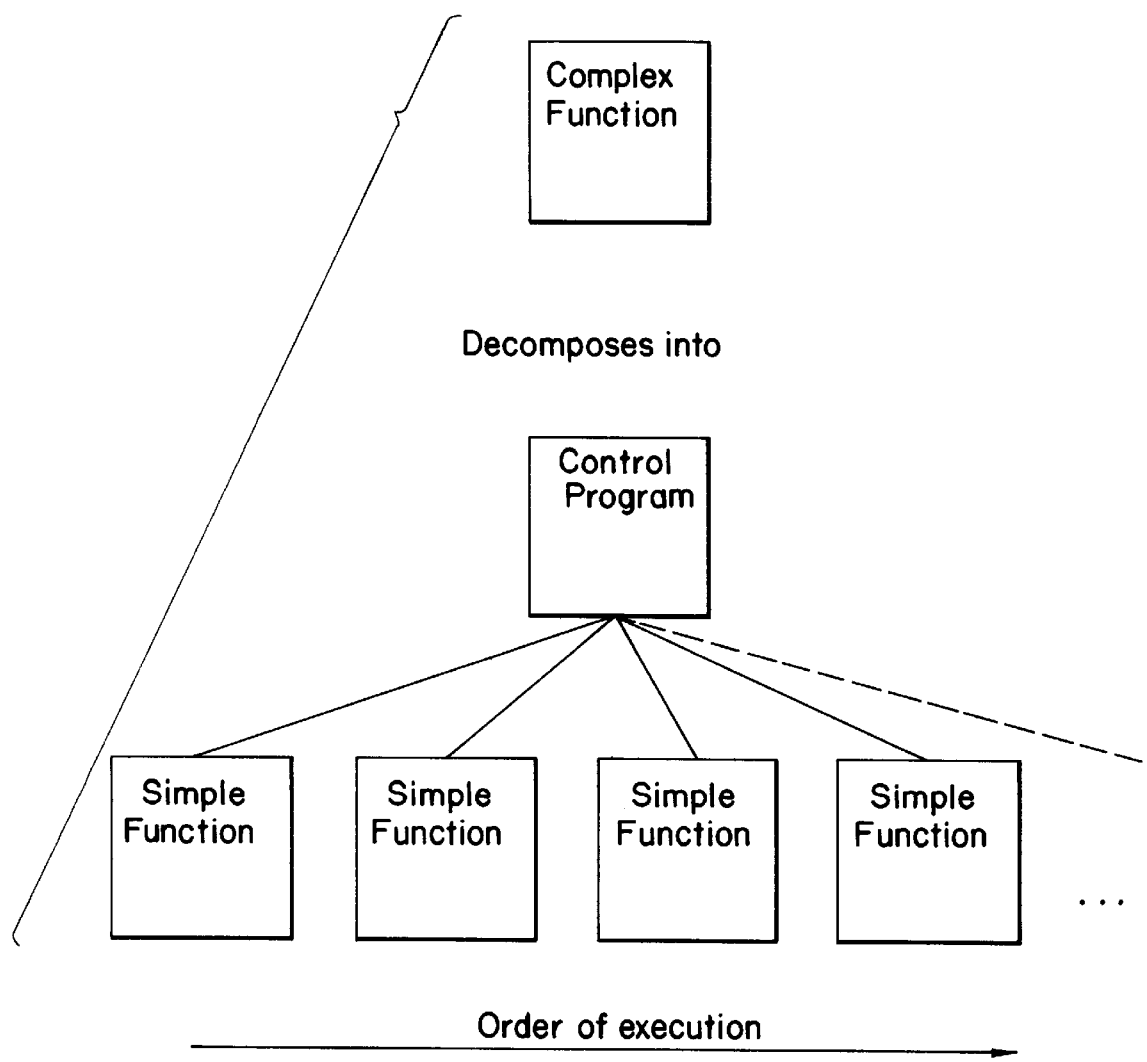
FIG. 3 is a diagram representing a decomposition of a typical program.

All computer programs express algorithms. These algorithms comprise a sequence of instructions or simple functions. As a consequence, any computer program, however complex, may be described by decomposing it into its related elements (FIG. 3). The nature of the instructions is not defined, but are generally taken to be an atomic unit of processing appropriate to the task in hand. In fact, in the construction of computer systems, the form of the "instructions" is usually defined by the task at hand and is then expressed using a suitable programming language. It is well known that such functions are best implemented as subroutines which can be re-used in similar instruction needs.

A feature of late binding programs is that they require information as they run which tells them how to react to a particular stimulus. In the description of run-time binding, the information was provided by a user sitting at a terminal. It is clear that in most circumstances, such a situation will not be acceptable. Another mechanism must be used to provide the needed information. One such mechanism is to maintain the configuration data in some form of a database. Such database may contain the information used to configure a late binding program for one set of circumstances. Changes to the configuration database change the behavior of the program.

The database contains references to the processing steps to be carried out for a particular stimulus. Since the definition of an algorithm is in terms of such processing steps, any operation which can be algorithmically carried out can be described in the late-binding program, configured by a database, which contains suitable preexisting program code and can carry out any process of which the computer is capable of performing. Therefore, any task which can be carried out in by a purpose-built program can be accomplished in a late binding program environment.

The task of connecting together a number of computer systems may be reduced to many separate tasks of connecting pairs of systems. The connector must complete three separate tasks. These tasks are:

1. Establish that the data from the sending system is meaningful to the receiver;
2. Establish a means of passing electronic, computer-readable information from the first system to the second system; and 3. Restructure the information to a form acceptable to the receiver. The first task is accomplished by examination of the systems concerned. The second by any suitable electronic protocol determined by the nature of the computing devices being connected. Neither of these tasks is suitable for solution by a computer system. Both require well-established techniques which can be readily accomplished on a case-by-case basis. The third task acknowledges that different computer systems represent information in different forms. It is well known that even in systems provided by the same manufacturer, the data structures describing objects in the real world are different in different systems, even when the real-world objects being described are identical. The principal source of complexity and delay in implementing system interconnections is concerned with producing the programs required to carry out the required date structure conversions.

With this general background, we now consider the implementation of late-binding programming methods.

The late binding programs described consist of two parts—a Control Program and subroutines, which carry out the required program steps. The purpose of the Control Program is to receive the incoming stimuli, with their associated data, and derive the appropriate action to be taken. The action takes the form of a list of subroutines to be invoked and an order in which they should be invoked. The Control Program then invokes the required subroutines in the required order, checking that each invocation was successful.

In the preferred embodiment of this invention, the programs may be written in any language; preferably the C programming language. The Control Program extracts its instructions from the database and retains them, in the form of arrays of data structures, in the computer's memory. (This extraction of data structures into memory structures is not essential, but it does enable the program to perform very much faster.) One of the data arrays consists of all of the required series of subroutine invocations. These data structures contain an executable function reference (in the C language this is a "function pointer") to the subroutine which is the reference required by the program in order to execute the subroutine. This function pointer cannot be held in the database. In order to determine the function pointers to all the required subroutines, the database contains a unique string of characters for each available subroutine (this is the function name and is actually coded into each subroutine). The Control Program contains a function which can convert these function names into function pointers. This operation is carried out by the Control Program when it first begins executing, removing the necessity to carry it out for each stimulus of the program.

Figure 7:
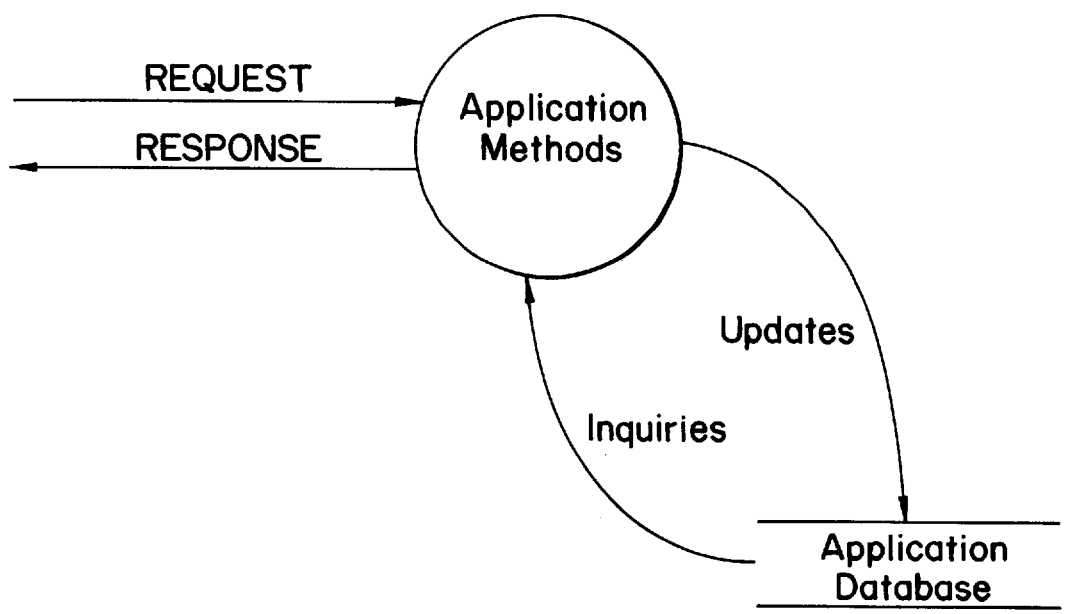
FIG. 7 is a diagram showing requests and responses to requests from a Control Program to a Method Program.

No application processing takes place in the Control Program. Its responsibilities are entirely concerned with the selection, sequencing, and execution of Methods. The Control Program extracts the information it requires from a database, which, for purposes of description, may be referred to as a "Metadatabase". Changes in the Metadatabase will be reflected in the change in behavior of the program. The process is shown in FIG. 7. The sequence is controlled by the Control Program, under the direction of the Metadatabase.

Based upon these principles, new programs can be created and modified with no change to the Control Program. This concept can be used both as method for creating programs and in a translator that translates one source of information to another. The reason for this is that once the Control Program establishes the basic steps, the translation of data in one format to data in another format are operations encompassed within Methods and the database structure that the Methods operate with and upon.

Figure 4:
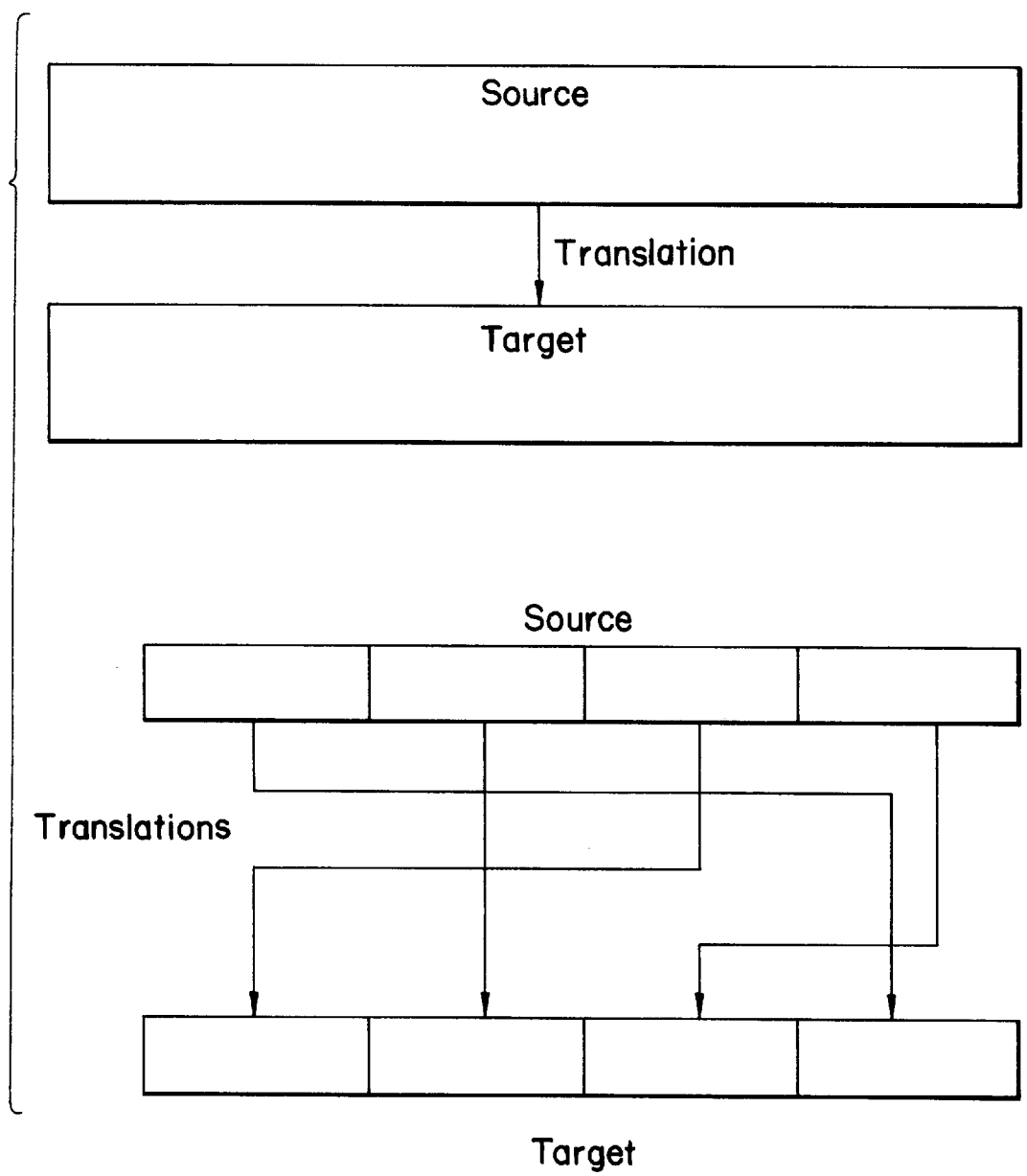
FIG. 4 is a diagram representing a Translation Program.

The Translation Program (FIG. 4) operates in the following manner: Once the data to be translated has been obtained (i.e., source data), it must be identified. This means the translation program must recognize which of the sets of possible incoming messages has been received. This identification determines the set of outgoing structures (i.e., target data) which must be conveyed to the receiver. This set can contain zero, one, or many outgoing structures. This translation can be decomposed into many smaller steps of translation, each of which applies to a simple value in the source data.

The decomposition is chosen such that the data type of each sub-section of the original structure is made up of a single type of computer-readable data (i.e., integer, floating point number, bit pattern, or character string). As a result, the ability to freely convert between data types can solve very many of the low level translations required. Examining the transformations which are not purely structural, it can be seen that the majority are not susceptible to algorithmic solution. These are normally conversions of arbitrary text from one value to another. An example of this is the conversion of a monetary currency code from one arbitrary form (e.g., that defined by Reuters) into another (e.g., that defined by S.W.I.F.T.). There is no change in the semantic value of the data--both the source and target represent a currency, but there is no algorithmic connection between the values. The solution for this type of transformation is to provide a sorted table of the range of possible source values and the corresponding target values, and a generalized mechanism for searching the table and substituting the target value into the target structure.

The set of subroutines required to implement a Translation Program consists, therefore, of a set of structural conversion routines. To carry out functions like:

Copy (with justification to left or right, as appropriate)

Convert from character to integer numeric formats (and vice versa)

Convert from character to floating point numeric formats (and vice versa)

Convert from floating point to integer numeric formats (and vice versa)

Lookup incoming data file in table of values (output result as characters, integer, or floating point)

A further list of representative functions is attached in the appendix. When invoked, each of these routines is passed a reference to the data it must take as input, a reference to the place its output must be written to, the maximum allowable lengths of input and output, and a reference to the lookup table (if any) being employed.

The Translation Program is, therefore, capable of carrying out any conceivable data translation, within the parameters of data structures, which can be described by the C programming language, which is capable of describing any data structure which can be represented on a modern digital computer.

The action of invoking a subroutine requires that the invoking program has three pieces of information about the subroutine:

A reference to the subroutine code (usually the function name or a function pointer)

The data required as parameters by the subroutine

The data to be returned to the invoker by the subroutine

In order for the Control Program to express any algorithm, all three of these features must either be constant or independent of the invoking Control Program. The subroutine reference is made independent through the function pointer mechanism described above. In the Translation Program, the parameter data is constant for all conceivable translation subroutines, as described above. The data returned by a subroutine is restricted to a numeric value, indicating success or failure.

These restrictions—this set of fixed parameters and a fixed return value—describe the requirements of a special subclass of subroutines which are known as Translation Methods. These subroutines are capable of being assembled into any conceivable Translation Program.

Translation Programs use a different type of Method, Identification Methods, to carry out the identification of incoming messages. These Identification Methods receive as their parameters the location of the received message, the offset and length, in bytes, of the area of the incoming message they are to examine and the location of the list of source messages, which includes arbitrary data to identify them. Identification Methods return a value to the Control Program indicating which, if any, of the incoming message types have been received.

The types of algorithm which can be carried out in Identification Methods include comparison to exactly known data values, comparison to partially known data values (using 'regular expressions'), or comparison to data types.

Translation Programs employ Translation Methods for all their translation activities. In order to extend the processing model of Control Program and subroutines to encompass general purpose programs, it is necessary to extend the range of subroutines which can be executed. It is particularly valuable to be able to use subroutines which were not purpose built for this environment. The ability to re-use well established code constructed for use in other programs enables a program using the Control Program and subroutine architecture to be constructed extremely rapidly for new applications.

The extension to general purpose programming is achieved by removing the restriction on the parameter data used by subroutines. A subroutine which is used in this environment is known as an Application Method. Application Methods are fixed pieces of program code which may be obtained in one of three ways:

1. They may be hand-constructed.
2. They may be built by extracting pre-existing Primitive Functions from existing systems.
3. They may be entire pre-existing systems.

Figure 5:
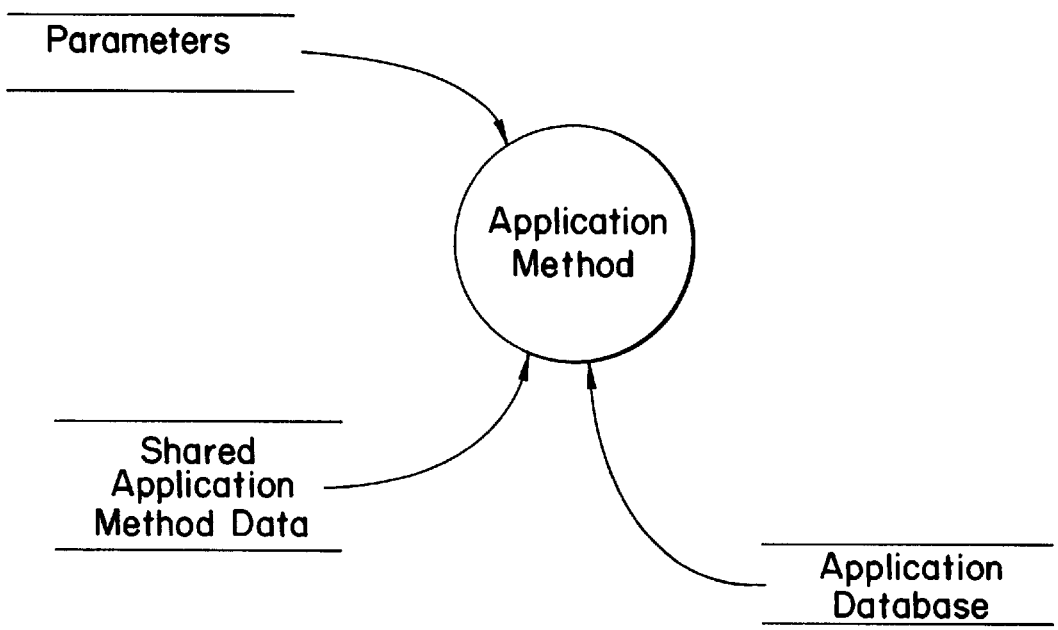
FIG. 5 is a diagram of a Method Program.

The Control Program attains its generality by treating all Methods in the same way. A Method exists in an environment shown in FIG. 5. A method carries out an algorithm or part of an algorithm. It carries out that algorithm on data. The Method obtains data from:

A database to which the Method controls its own access

Data shared with other Application Methods (global storage)

Parameters

All three of these types of data access are carried out through data structures which are controlled entirely within the Application Method. This allows Methods to be totally independent of each other, except where specifically allowed for, by including of shared data structures. Methods are always independent of the Control Program. The mechanism by which the Application Method obtains data from a database or thorough shared data structures is fixed as part of its internal construction. These mechanisms of obtaining data are completely independent of the Control Program. The Control Program must, however, provide the parameter data to the Application Method in order that it may be freely reused.

Figure 6:
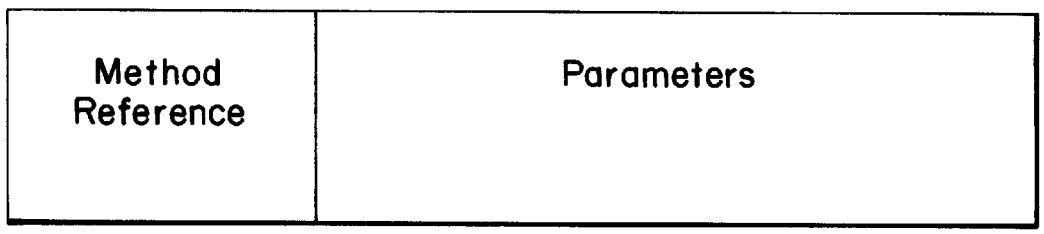
FIG. 6 is a diagram of the data structure of a Method Program.

In order to allow the Control Program to do this, a Translation Program is used. When a stimulus arrives at the Control Program, the Control Program invokes its internal Translation Program. The Translation Program creates one data structure for each Application Method to be executed. The data structure takes the form shown in FIG. 6. This structure is used by an extension of the Control Program to invoke the Method referred to in the Method reference, passing the parameters in the remainder of the structure.

This technique allows the Control Program to execute any subroutine which is written in a common computer language. Thus, because the Control Program is written in C, this means any language can be used which can be called form C.

There will remain some cases where the process of calling the subroutine is inappropriate or that some other language or implementation restriction prevents direct access from the Control Program to the subroutine. In such cases a "wrapper" program (or a series of wrappers) is used. A "wrapper" is a subroutine whose purpose is to be callable by the Control Program and be capable of invoking the required Application Method Program. This small extension to the construction of Application Methods enables a software developer to employ any conceivable piece of software as an Application Method.

The steps for the creation of the program include determining the need for a translation program and to understand the scope of the tasks it will have carried out, by an individual. This requires a determination of the list of incoming messages the computer will receive. Once the list of possible messages has been assembled, a mechanism for distinguishing between them, based only on their structure and content, must be determined. The next step is to determine for each incoming message, the translator's reaction. In other words, in response to the incoming message or stimulus, the translator can create no outgoing messages (i.e., ignore the incoming message) or create one message or create many messages. The number will be known.

The next step is to decompose the program steps by identifying the simple data elements that make up the structure of each target message. This, like the previous steps, is performed manually. There then follows the identification of the simplest elements that make up the original structure which correspond to those resultant elements in the source message. For each one of the original structure simple elements that are required for the source, one next decides what kind of transformation is required to create the appropriate resultant element. It there are any requirements of sequencing, these must be taken into account. If, for example, there is the taking of an average then it is important that addition be completed before division. In all other cases an arbitrary order is acceptable. The result of this analysis is a set of transformation instructions which consists of the originating data elements (i.e., a field in the first structure), a resulting data element (i.e., a field in the second structure), and the Transformation Method required between them. Each one of those makes up one row in the XLAT details table of the Metadatabase. This may be set aside in the translation details table as XLAT-DETAILS.

The data is then entered into tables in the Metadatabase. The existence of a translator is recorded in the location table, also recorded here is the Identification Method to be invoked to distinguish between the incoming messages and the section of the incoming messages to be examined by the Identification Method. Each of the incoming message types is recorded in the source table together with any arbitrary data to be found in messages of this type in the section defined in the location table. Each of the target messages for each source message is recorded in the target table. Each of the details of the transformation is recorded in a translation details table.

For each transformation there is a Method that is invoked (i.e., a subroutine that carries out the particular transformation required) which is represented by a reference back to the methods table in the Metadatabase. The methods table itself contains a name for an executable subroutine (i.e., a Method). That name is used by the Control Program to derive the executable function reference of the appropriate subroutine when it reads the database. The final result for each of the transformations is identified as it comes to this reference. It then resolves the reference to find the subroutine and execute the subroutine. The other information that it has to pass to the subroutine, which is parameter information, consists of a pointer to where the source field is in its temporary computer memory; where the target field is in its temporary computer memory; the size of those fields in bytes, and, if necessary, a reference to a look up table which would be used in nonalgorithmic transformations. In other words, the process of analysis populates the database in terms of the shapes and structures of messages and which ones need to be translated and the Control Program interprets those as instructions for carrying out the translation.

The Control Program exists in a world where it is receiving stimuli. In effect it is being given incoming data to operate upon.

Thus far, the Control Program is written to extract the data from the Metadatabase and derive the instructions from this data in terms of which Methods should be called under which stimuli. It is a mandatory requirement that there is nothing in the Control Program which refers to any other activity. The Control Program reads the Metadatabase and uses instructions found there to manipulate data structures that it is given.

A Method is that which actually does the manipulation. For instance, one of the instructions might be "copy the third field in the incoming to the sixth field in the outgoing". The Control Program locates the third field in terms of byte addresses. The Control Program also looks up the size of the third field in the Metadatabase. The next step performed by the Control Program is to locate the sixth field in the target message and its size, in bytes. The next step performed by the Control Program, in accordance with directions received from the Metadatabase, is to execute a Method which may be, for example, "copy". It executes that Method passing it the position and length of the target and source. The Method carries out the activity of copying from the source position to the target position. Note that the Control Program does not do the copying, however. It only invokes something (i.e., a Method) whose executable function reference is derived from the word "copy" which it retrieved from the Metadatabase. As with this example, in any other type of transformation exactly the same process is repeated. The Control Program, under direction of instructions in the Metadatabase, calculates the size and position of the source and target data and invokes the appropriate Method, passing it that information. The Control Program's activities are restricted to calculating parameters and invoking Methods. It does not "know" what the Methods do. In other words, it is a neutral program.

Each time a Method executes, the executed Method tells the Control Program whether or not it successfully completed that operational step. The Control Program examines this returned value to ensure that each Method was successful, thereby checking that the source to target transformation has been successfully completed. When the Control Program has executed all the Methods it is directed to do, it delivers the outgoing structure to the receiver. The Control Program then waits for the next incoming signal or stimulus.

In a preferred structure of this process, it is recognized that the types of messages that a given translator receives change very slowly compared to the rate at which messages are received. In other words, a translator can expect to receive many copies of a given structure of message before the structure of that message is changed by the sender. The process the computer goes through in examining a Metadatabase held in disk files is very time consuming. It has to read a lot of database files which, as is well known, is very complicated and difficult. The computer is forever required to carry out the same calculations each time a stimulus is received, time and time again: Where is the first field, where is the fourth field. A preferred way of constructing a translation program is that all of the calculations of positions and lengths and resolving all of the Methods from text names into function pointers is carried out when the Control Program first begins processing. The Control Program then stores an abbreviated version of its portion of the Metadatabase in an allocated part of RAM memory. This forms the data arrays referred to earlier. The only purpose of this stored memory is to speed up the operation of the program. It has been observed that this stored memory improves operation speed by approximately a factor of about 1,000. The concept is similar to the use of cache memory in the process of reading from and writing to disk files, except that in cache writing no manipulation of data occur. In a cache a computer writes in and copies out repetitive instructions. Here, in this case, the computer not only reads into memory, which is what cache does, but it also converts the information to a more directly useful form. The creation of this version of the Metadatabase occurs when the program first begins processing. When the Control Program receives an incoming message, a stimulus, instead of referring to the actual Metadatabase, it uses the Control Program's internal memory structures which, as indicated are an abbreviated version of the same data which are contained in the Metadatabase.

Translation Methods are written as subroutines which receive a particular set of parameters. Each Method carries out a particular type of transformation. For example, there is one to do copying and one to do conversion of character format numbers into integers. Each of the Methods carries out a particular type of manipulation of simple data types. The number of simple data types is very small. As a consequence, there is provided a complete set of such Methods.

Application Methods are different from Translation Methods. As stated above, a characteristic of a translator is that it has this requirement that all the Translation Methods take exactly the same parameters. This requirement is to restrict the Control Program to interpret the steps taken by the Methods and retains the Control Program's neutrality. This neutrality is essential to this invention because it enables the entire program to be easily modified and expanded without making any changes to the Control Program. This enables the addition of Methods to allow the entire program to perform new functions without informing (i.e., modifying) the Control Program.

When a subroutine is executed in any program language, a formal structure is required. A part of that formal structure is the parameters that are passed to the subroutines. The calling program needs to pass exactly the same parameters as the called the program expects to receive otherwise the results are unpredictable. In other words, the Control Program that executes a particular Translation Method, and the parameters to Translation Methods are very simple and are all always going to be the same. In the case of the Translator, this does not create a problem, since all conceivable Translation Methods will require the same parameter data. One can then add new Translation Methods to do new jobs with impunity. This is because the parameters are identical.

In the case of general purpose programs one can never predict what the parameters required for a new Method will be. It is important, however, that the Control Program is able to accept new Methods with their own new parameter sets without the requirement of changing the Control Program.

This problem is solved by placing all of the parameters required by an Application Method into a data structure. This places the requirement on Application Methods that they receive all their parameters in the form of a structure. In the case of Application Methods which are obtained from code written for other systems, this may not be correct. However, it is a simple matter for a "wrapper" program to convert the data in a structure into separate parameters. The parameter structure required by an Application Method is a data structure which can be created by a Translation Program.

To solve this problem the Application Methods have different requirements. First Application Methods are called differently than Translation Methods. Instead of giving Application Methods their parameters, these parameters are stored in a database table. Any information that a computer can hold, it can hold in a data structure. Thus, in an ordinary computer program a program can call an ordinary subroutine with its separate parameters. In this case, the Application Program is called, it refers to the database to find one parameter which is a data structure that contains all the parameters that the Method requires. It does not matter what the Method requires. In other words, there is no limitation to the idea of a structure as opposed to separate pieces of data. The Application Methods each have a requirement that their parameters are in the form of a stored structure. The only limit on the Application Method is how their parameters are set.

Applying the techniques of a translator to the Application Method, we build an Application Program. As a first step it is decided that there is a need for an Application Program. The programmer lists all of the stimulus messages that the Application Program will receive. As in the Translator, each one of the stimuli go into a sources table. A list is made of all Application Methods which will carry out the required operations and any ordering requirements. Each of those Application Methods invocations is recorded as a row in the target table. In other words, each one of these is now a message. Each of these targets is a special message which consists of two parts (see FIG. 6). The first part of the message is always a reference to an Application Method. The second part is a reference to the parameter structure that Method requires. The next step is to create the target message out of the stimulus. That is done in the same way as with the stand alone translator: by identifying what part of the incoming or source message creates each one of the parameters, and then we use one of our Methods which is "just set a value". In other words, in order to create the Method function named at the beginning of the message, a Method which sets a value from a lookup table is used. (This is because we do not expect to see any part of the stimulus message which refers to method function names.). Thus far all that is happening is that the program behaves exactly like a Translator. Then, instead of delivering the message to a receiver as a target message, which is what a translator does, a new piece of Control Program (known as a Server Shell) uses it internally. It resolves the Method reference in the same way the Translator resolves its Translation Methods. Thus, it converts the reference to a function pointer and thereby invokes that Method. Passing a pointer reference to the remainder of the message as a parameter. The Control Program then checks return codes as in the Translator to complete the process, as before.

Attached as an appendix are the preferred embodiments of the design documentation of the translator and Server Shells which comprise the application writing program. The diagrams are Gane and Sarson style flow diagrams with descriptions attached thereto.

The Control Program is a program which invokes basic computing steps in the form of Methods. It calls upon databases to tell it or instruct it as to which of these Methods should be used under which circumstances of incoming data. The basic steps are created outside the Control Program and new ones can always be added without changing the Control Program. Therefore, any changes made to the program are to be made in the Methods or the databases which the Methods use. This process all but eliminates the necessity for rewriting programs.

What is claimed is:

1. A method for responding to a stimulus message, comprising the steps of:
(a) providing a computer, having a control program executing therein;
(b) providing at least two distinct and independent response generation programs for execution by the computer, each response generation program being callable by the control program to process data relating to at least a portion of a stimulus message;
(c) providing a database, associated with the computer, storing information relating to the implementation of an appropriate response to a type of stimulus message, the information identifying optional response generation programs and optional data;
(d) providing a stimulus message to the control program;
(e) accessing the database to retrieve information relating to a type of the provided stimulus message; and
(f) for each identified response generation program:
(i) calling the response generation program, optionally passing data;
(ii) generating an appropriate response to the stimulus message and optional data with the response generation program;
(iii) returning to the control program,
the application processing behavior of the computer being defined by the response generation programs, the information in the database and the stimulus message.

2. The method of claim 1 wherein the stimulus is a source message and the response is a target message, the response generation program being a translation program, for processing the source message and translating at least a portion thereof into the target message, the database storing instructions and data, the control program being limited to responding to the source message, accessing the database, and executing the translation program in response to instructions and data stored in the database.

3. The method of claim 1, further comprising the step of storing instructions and data in the database, including storing response generation program invocation instructions to be acted upon by the control program.

4. The method of claim 1 wherein the database records each include a unique string of characters or function names for each response generation program; the control program converting function names into appropriate response generation program references.

5. The method of claim 1, further comprising the step of, upon an initialization of the control program in a late binding stage of program execution, causing the control program to access stored database records.

6. The method of claim 5, further comprising the step of, upon initialization, converting function names in database records into appropriate response generation program references.

7. The method of claim 1, wherein the database identifies a sequence of execution of response generation programs.

8. The method of claim 3, wherein the step of storing data and instructions in the database includes providing a sorted table of the range of possible values and a generalized mechanism for searching the table for use with nonalgorithmic responses.

9. The method of claim 2, wherein the step of providing at least two distinct and independent response generation programs includes providing a multiplicity of translation programs; the step of calling a response generation program includes causing the control program to access the database to obtain a reference to a location of source data, a reference to a location of the target data that translated source data is written to, the maximum lengths of each source data and target data, and a reference to any lookup table designated by the database.

10. The method of claim 2, wherein the step of translation comprises an operation selected from the group consisting of:

copying (with justification to left or right, as determined by the source and target data);

converting from character to integer numeric formats (and vice versa);

converting from character to floating point numeric formats (and vice versa);

converting from floating point to integer numeric formats (and vice versa); and looking up incoming data file in table of values (output result as characters, integer, or floating point).

11. The method of claim 1, wherein the step of accessing the database to retrieve information relating to a type of the provided stimulus message includes retrieving a reference from the database identifying a response generation program, the data required as parameters by the response generation program, and the data to be returned by the response generation program.

12. The method of claim 11, wherein the step of retrieving a reference to the response generation program comprises retrieving a reference to a function name stored in the database.

13. The method of claim 12, wherein the response generation programs have associated function pointers, further including the step of causing the control program to derive function pointers from the function names stored in the database.

14. The method of claim 2, further comprising the step of, after being called, permitting the translation program to access the database.

15. The method of claim 1, wherein, upon returning to the control program, the response generation program passes a message indicating success or failure in generating the response to the stimulus.

16. The method of claim 1, wherein information passed between the control program and the response generation program has a predetermined format.

17. The method of claim 2, wherein a format of the target and source messages is predetermined.

18. The method of claim 2, wherein the step of translating is a method selected from the group consisting of:

copying, byte-for-byte, with right or left justification;

looking up the source value in a sorted table and setting the target to the value corresponding to the source value;

looking up the source value in a sorted table and setting the target to the value corresponding to the source value, converted to a short integer;

looking up the source value in a sorted table and setting the target to the value corresponding to the source value, converted to an integer;

looking up the source value in a sorted table and setting the target to the value corresponding to the source value, converted to a long integer;

looking up the source value in a sorted table and setting the target to the value corresponding to the source value, converted to a floating point number;

looking up the source value in a sorted table and setting the target to the value corresponding to the source value, converted to a double precision floating point number;

converting from characters (containing only numeric characters, optional separators for thousands and spaces) to the corresponding short integer value;

converting from characters (containing only numeric characters, optional separators for thousands and spaces) to the corresponding integer value;

converting from characters (containing only numeric characters, optional separators for thousands and spaces) to the corresponding long integer value; converting from characters (containing only numeric characters, optional separators for thousands, an optional decimal character and spaces) to the corresponding floating point value;

converting from characters (containing only numeric characters, optional separators for thousands, and optional decimal character and spaces) to the corresponding double precision floating point value;

converting from a short integer to a character field;

converting from an integer to a character field;

converting from a long integer to a character field;

converting from a floating point number to a character field;

converting from a double precision floating point number to a character field;

converting from a double precision floating point number to a PICTURE field, as defined in the COBOL programming language;

converting from a PICTURE field, as defined in the COBOL programming language to a double precision floating point number;

setting an arbitrary value in the target field;

adding the source value to the short integer target field;

adding the source value to the integer target field;

adding the source value to the long integer target field;

adding the source value to the floating point target field;

adding the source value to the double precision floating point target field;

subtracting the source value from the short integer target field;

subtracting the source value from the integer target field;

subtracting the source value from the long integer target field;

subtracting the source value from the floating point target field; subtracting the source value from the double precision floating point target field;

multiplying the source value by the short integer target field;

multiplying the source value by the integer target field;

multiplying the source value by the long integer target field;

multiplying the source value by the floating point target field;

multiplying the source value by the double precision floating point target field;

dividing the source value by the short integer target field;

dividing the source value by the integer target field;

dividing the source value by the long integer target field;

dividing the source value by the floating point target field;

dividing the source value by the double precision floating point target field;

applying a logical, bitwise AND operation between the source field and target field;

applying a logical, bitwise INCLUSIVE OR operation between the source field and target field; and applying a logical, bitwise EXCLUSIVE OR operation between the source field and target field.

19. A method of creating programs for operating a computer, in which there is late binding of program elements responding to source stimuli, in which each stimulus is of the type comprising one of a predetermined set of events and one of a predetermined set of data structures, comprising:

(a) providing a control program executing on a computer;

(b) providing the source stimuli to the control program;

(c) providing a database associated with the computer;

(d) storing instructions, data, and the structures of any source stimuli to be acted upon in the database;

(e) causing the control program to access the database;

(f) causing the control program to respond to instructions and data stored in the database, and based on the instructions and data stored in the database selectively invoking at least one application method program for execution on the computer; and (g) limiting the control program to responding to the source stimulus, accessing the database, and respond to instructions and data stored in the database.

20. The method of claim 19, further comprising providing a set of predetermined application method programs.

21. The method of claim 20, further comprising the step of storing in the database the parameters of all predetermined application method programs; and wherein the step of causing the control program to respond to the source stimulus comprises causing the control program to transmit, under the direction of instructions and data retrieved by the control program from the database, predetermined structures of parameters to predetermined application method programs.

22. The method of claim 21, wherein the step of storing includes storing the parameters structures in the database.

23. The method of claim 21, wherein the step of causing the control program to transmit parameters further comprises the step of receiving instructions and data by the control program to determine which of any predetermined application method programs are to be invoked.

24. The method of claim 21, wherein the step of invoking includes passing parameters to the application method programs.

25. The method of claim 21, further comprising the steps of providing wrappers; calling at least one wrapper with control program; using the at least one wrapper to invoke an application method program or another wrapper.

26. The method of claim 21, in which the step of storing instructions and data in the database includes storing an application method program invocation instruction; and the control program, in response to the stimulus and the information obtained from the database calling at least one predetermined application method program.

27. The method of claim 25, wherein the step of providing instructions and data to the database includes providing a unique string of characters or function names for each application method program or wrapper; further comprising the step of converting, with the control program, function names into function pointers.

28. The method of claim 27, further comprising the step of providing means for translating predetermined data of the stimuli to predetermined parameter structures of the application method program and wrappers.

29. The method of claim 19, further comprising the step of causing the control program to retrieve information from the database relating to a temporal sequence of execution of a plurality of response generation programs; said causing the control program to respond step further comprising in the temporal sequence, invoking each of the plurality of response generation programs for execution on the computer.

30. The method of claim 19, wherein the step of storing instructions, data and the structures of any source stimuli to be acted upon in the database includes providing sorted tables of a range of possible values and a generalized mechanism for searching the table for nonalgorithmic translations.

31. The method of claim 26, wherein the step of providing an application method program includes providing a multiplicity of application method programs; the step of executing an application method program includes causing the control program to access the database to obtain the parameter structure for the application method program, a reference to the location of the stimulus data, a reference to the location of the application method parameters which must be written to, the maximum lengths of each element of the stimulus structure, the maximum length of the stimulus data and parameter structure, and a reference to any lookup table set forth in the instructions in the database.

32. The method of claim 19 wherein the application processing program translates data in one form into data in another form, the translation being selected from the group consisting of:

copying (with justification to left or right, as determined by the stimulus data and the parameter structure of the application method);

converting from character to integer numeric formats (and vice versa); converting from character to floating point numeric formats (and vice versa); and converting from floating point to integer numeric formats (and vice versa); looking up incoming data in table of values (output result as characters, integer, or floating point).

33. The method of claim 25, wherein the step of calling at least one wrapper comprises providing from the database previously stored instructions and data; including a reference to the wrapper code; the data required as parameters by the invoked application method program or wrapper; and the data to be returned to the control program by the invoked application method program or wrapper.

34. The method of claim 27, further comprising the step of storing a function name as a reference to an application method program in the database.

35. The method of claim 19, further comprising the step of having each invoked application method program provide an indicia to the control program, the indicia indicating a success or failure of execution of that application method program.

36. The method of claim 35, wherein the step of providing the indicia includes, where the control program invokes the application method program, passing the indicia directly to the control program from the application method program.

37. The method of claim 35, wherein the step of providing the indicia includes, where at least one wrapper invokes the application method program, passing the indicia through the invoking wrapper to the control program from the application method program.

38. The method of claim 19, wherein the application processing program translates data in one form into data in another form, the translation being selected from the group consisting of:

copying, byte-for-byte, with right or left justification;

looking up the source value in a sorted table and setting the target to the value corresponding to the source value;

looking up the source value in a sorted table and setting the target to the value corresponding to the source value, converted to a short integer;

looking up the source value in a sorted table and setting the target to the value corresponding to the source value, converted to an integer;

looking up the source value in a sorted table and setting the target to the value corresponding to the source value, converted to a long integer;

looking up the source value in a sorted table and setting the target to the value corresponding to the source value, converted to a floating point number;

looking up the source value in a sorted table and setting the target to the value corresponding to the source value, converted to a double precision floating point number;

converting from characters (containing only numeric characters, optional separators for thousands and spaces) to the corresponding short integer value;

converting from characters (containing only numeric characters, optional separators for thousands and spaces) to the corresponding integer value;

converting from characters (containing only numeric characters, optional separators for thousands and spaces) to the corresponding long integer value;

converting from characters (containing only numeric characters, optional separators for thousands, an optional decimal character and spaces) to the corresponding floating point value;

converting from characters (containing only numeric characters, optional separators for thousands, and optional decimal character and spaces) to the corresponding double precision floating point value; converting from a short integer to a character field;

converting from an integer to a character field; converting from a long integer to a character field;

converting from a floating point number to a character field; converting from a double precision floating point number to a character field;

converting from a double precision floating point number to a PICTURE field, as defined in the COBOL programming language;

converting from a PICTURE field, as defined in the COBOL programming language to a double precision floating point number;

setting an arbitrary value in the target field;

adding the source value to the short integer target field; adding the source value to the integer target field;

adding the source value to the long integer target field; adding the source value to the floating point target field;

adding the source value to the double precision floating point target field;

subtracting the source value from the short integer target field;

subtracting the source value from the integer target field;

subtracting the source value from the long integer target field;

subtracting the source value from the floating point target field;

subtracting the source value from the double precision floating point target field;

multiplying the source value by the short integer target field;

multiplying the source value by the integer target field;

multiplying the source value by the long integer target field;

multiplying the source value by the floating point target field;

multiplying the source value by the double precision floating point target field;

dividing the source value by the short integer target field;

dividing the source value by the integer target field; dividing the source value by the long integer target field;

dividing the source value by the floating point target field;

dividing the source value by the double precision floating point target field;

applying a logical, bitwise AND operation between the source field and target field;

applying a logical, bitwise INCLUSIVE OR operation between the source field and target field; and applying a logical, bitwise EXCLUSIVE OR operation between the source field and target field.

39. A method of generating a translation program for translating each of a set of source messages into a corresponding target message, comprising:

(a) identifying the characteristics of each source message;

(b) for each source message, identifying the characteristics and parameters of a corresponding target message;

(c) deriving the requirements to translate a source message to a corresponding target message;

(d) providing a database;

(e) storing in the database data and instructions corresponding to the steps necessary to translate each member of the set of source messages to a corresponding target message;

(f) providing a plurality of translation method programs, the plurality of translation method programs including, for each type of element of a source message, ones capable of transforming a type of element of the set of source messages to a corresponding type of element of a target message;

(g) storing references in the database to each of the translation method programs;

(h) storing instructions in the database identifying which translation method programs are to be called for a particular source message; and (i) causing the control program to obtain from the database, upon receipt of a source message, the instructions in the database to direct the control program and call upon identified translation method programs to translate the source message to a corresponding target message, the operation of the control program being defined by the instructions and data in the database.

40. The method of claim 39, further comprising the step of outputting the target message from the control program.

41. The method of claim 39, wherein the step of for each source message, identifying the characteristics and parameters of a corresponding target message, includes identifying date information elements of the target message and of the source message.

42. The method of claim 39, wherein the step of deriving the requirements to translate includes the step of parsing the source message and a corresponding target message into simple elements, forming correspondences of simple elements of the source message and target message.

43. The method of claim 42, wherein the step of deriving the requirements to translate further includes defining transformations between each of the simple elements of the source message and the simple elements of the target message.

44. The method of claim 43, wherein the step of defining the transformations further comprises determining a sequence of the steps of translation.

45. The method of claim 39, wherein the step of storing comprises storing the steps of translation; providing in the database at least one table; storing the data and instructions in the table; and storing a location of a translation method program and a sequence of calling the translation method program.

46. The method of claim 45, wherein the database resides in a permanent storage location within a computer system, the computer system further having a temporary storage locations, further comprising the step of, upon an initialization of the control program storing in a temporary storage location: a table containing data used to identify different types of source messages; pointers for identifying the location of the source fields in the source message; lookup tables for nonalgorithmic transformations; instructions identifying circumstances under which a translation method program is to be called; and a sequence of operations with which to direct the control program.

47. A method of generating an application program comprising:

(a) defining a possible set of stimulus message types;

(b) separating each stimulus message into one or more simple elements and optionally parameters;

(c) defining a correspondence between each of the set of stimulus message types and a desired response message type, and a correspondence between any optional parameters and desired response message parameters;

(d) defining a transforming algorithm for translating each of the set of stimulus message types to a corresponding one of the response message types, including a sequence of operations to be performed on the simple elements and optional parameters;

(e) storing, in a database, a plurality of addressable tables each storing references to the sequence of operations to be performed on the simple elements and optional parameters for each stimulus message type;

(f) providing, for each operation referred to in the database, an application program capable of performing that operation;

(g) providing a control program for determining a stimulus message type, and accessing the database to retrieve a table corresponding to simple elements of the stimulus message type;

(h) calling, from the control program, applications programs in sequence to transform the simple elements and optional parameters;

(i) transforming sufficient simple elements and optional parameters to construct a translated target message;

(j) outputting the translated target message corresponding to the source message.

48. The method of claim 47, wherein said step of providing, for each operation, an application program capable of performing one of the sequential operation comprises the step of manually creating an application program.

49. The method of claim 47, wherein said step of providing, for each operation, an application program capable of performing one of the sequential operation comprises the step of selecting an application program from a stored set of application programs based on operating behavior of the application programs.

50. The method of claim 47, wherein said step of providing, for each operation, an application program capable of performing one of the sequential operation comprises the step of copying an application program from a library containing a plurality of application programs.

51. A computer readable medium having a program stored thereon, for executing the method according to claim 1.

52. A computer readable medium having a program stored thereon, for executing the method according to claim 39.

53. A computer readable medium having a program stored thereon, for executing the method according to claim 47.

* * * * *